United States Patent [19]

Goswami

[11] Patent Number: 4,489,193

[45] Date of Patent: Dec. 18, 1984

[54] BLEND OF INTERNALLY PLASTICIZED VINYL CHLORIDE COPOLYMER AND ETHYLENE/CARBON MONOXIDE POLYMER

[75] Inventor: Jagadish C. Goswami, New City, N.Y.

[73] Assignee: Stauffer Chemical Company, Westport, Conn.

[21] Appl. No.: 229,818

[22] Filed: Jan. 30, 1981

[51] Int. Cl.³ .................... C08L 27/06; C08L 101/06
[52] U.S. Cl. .................................. 525/190; 525/185; 525/188; 525/231
[58] Field of Search ............... 525/231, 539, 185, 190, 525/188

[56] References Cited

U.S. PATENT DOCUMENTS

| | | | |
|---|---|---|---|
| 3,780,140 | 12/1973 | Hammer | 525/185 |
| 3,988,519 | 10/1976 | Stoller | 428/15 |
| 4,123,585 | 10/1978 | Sparzak et al. | 428/379 |
| 4,147,853 | 4/1979 | Goswami et al. | 526/278 |

OTHER PUBLICATIONS

Du Pont "Elvaloy" 741 & 742 Resin Modifiers pp. 3–10 (1978).
Polymer Engineering and Science, Miscibility of "Poly(Vinyl Chloride) with Ethylene-Ethyl Acrylate-Carbon Monoxide Terpolymers" May 1977, vol. 17, No. 5, pp. 300–304.
Abstract of European Patent, Stau A94 72143B/40 EP 4391.
Whittington's Dictionary of Plastics, First Ed., Technomic Publishing, Stamford, 1968 p. 133.
Journal of Applied Polymer Science, vol. 23, pp. 623–625.

*Primary Examiner*—Carman J. Seccuro
*Attorney, Agent, or Firm*—Richard P. Fennelly

[57] ABSTRACT

The blending of an effective amount of an ethylene/carbon monoxide polymer with an internally plasticized vinyl chloride copolymer improves the low temperature flexibility and color stability during ageing of films made from the resulting blend as compared to films containing the internally plasticized resin in the absence of the ethylene/carbon monoxide polymer.

3 Claims, No Drawings

BLEND OF INTERNALLY PLASTICIZED VINYL CHLORIDE COPOLYMER AND ETHYLENE/CARBON MONOXIDE POLYMER

BACKGROUND OF THE INVENTION

The present invention relates to a blend of polymers which is useful in making film products and which contains an internally plasticized vinyl chloride copolymer.

DESCRIPTION OF THE PRIOR ART

Externally plasticized vinyl chloride films have been used to make "coated fabrics" which, when bonded to a fabric substrate, for example, are useful as upholstery material. An example of such conventional technology is described in U.S. Pat. No. 3,988,519 to F. L. Stoller. Recently, it has been suggested to substitute the polyvinyl chloride polymer and external plasticizer in such products with an internally plasticized vinyl chloride copolymer resin (European Pat. No. 4,391). Although such products represent an improvement over externally plasticized films in regard to their lessened tendency to "fog" (due to the absence of transient external plasticizer), they still have certain drawbacks when intended for use in certain commercial embodiments having rather stringent requirements regarding such combined characteristics as the pliability, strength and cold crack resistance of the product.

SUMMARY OF THE PRESENT INVENTION

The present invention is a blend of internally plasticized vinyl chloride copolymer and an effective amount of an ethylene/carbon monoxide terpolymer to improve the physical properties of films formed from the blend as compared to films containing the internally plasticized vinyl chloride copolymer in the absence of the ethylene/carbon monoxide terpolymer. In particular, such properties as pliability, strength, low temperature flexibility or cold crack resistance, and color stability during heat aging of the films are improved.

DESCRIPTION OF THE PRESENT INVENTION

The blend of the present invention comprises, as one component, a suitable internally plasticized vinyl chloride copolymer. Generally, this copolymer will comprise from about 40% to about 60%, by weight of the blend. The additional components of the blend will be an ethylene/carbon monoxide polymer additive, and, in preferred embodiments, one or more conventional heat and light stabilizers, ultraviolet stabilizers, pigments, fillers, dyes, fungicides, and the like, in amounts conventionally used. The blend can be used to make films, which when laminated to a suitable fabric backing, are useful as upholstery material.

For purposes of the present invention, the terminology "internally plasticized" is to be construed as covering copolymers having an agent incorporated in the resin itself during polymerization to provide the needed degree of flexibility to films made containing the copolymer rather than to conventional vinyl chloride polymers or copolymers requiring a plasticizing amount (e.g., 25 to 100 parts by weight per 100 parts by weight of resin) of external plasticizer during resin compounding to achieve such results.

Internally plasticized vinyl chloride copolymer resins suitable for use in the present invention can be formed by polymerizing vinyl chloride monomer in the presence of an effective amount (10% to 50%, by weight) of at least one comonomer which functions as an internal plasticizer. Included within this class of plasticizing comonomers are the alkyl acrylates and methacrylates containing up to about 18 carbon atoms in their alkyl moieties, the vinyl esters of carboxylic acids and ethylenically unsaturated dicarboxylic acids, their anhydrides, and their mono- and dialkyl esters containing up to about 20 carbon atoms in their alkyl moieties.

The internally plasticized resin suitable for use in the present invention should have a $T_g$ of from about $-10°$ C. to about $30°$ C. and should give a vinyl film having a Shore "A" Hardness of from about 70 to about 95 when in the absence of functional additives and when no substantial amounts of plasticizer are present.

A preferred internally plasticized copolymer resin for use in the laminate of the present invention is described in U.S. Pat. No. 4,147,853 to J. C. Goswami et al., which is incorporated herein by reference. This copolymer comprises: (1) from about 50% to about 85%, by weight, vinyl chloride; (2) from about 3% to about 47%, by weight of a $C_6$–$C_{10}$ alkyl acrylate; and (3) from about 47% to about 3%, by weight, of a bis(hydrocarbyl)vinylphosphonate of the formula:

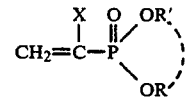

where X is selected from the group consisting of hydrogen, halogen, cyano, aryl (such as phenyl), $C_1$–$C_{18}$ alkyl and

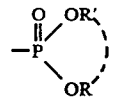

where R and R' are hydrocarbyl and substituted hydrocarbyl groups consisting essentially of hydrogen and carbon, and containing up to about 18 carbon atoms, inclusive, with the proviso that R and R' may be the same, different or conjoint, i.e., R and R' may combine to form one single radical. Preferred weight amounts for the comonomers used to make the above-described copolymer are: (1) from about 55% to about 80%, by weight, vinyl chloride; (2) from about 10% to about 35%, by weight, of the acrylate; and (3) from about 5% to about 25% by weight of the vinylphosphonate. A particularly preferred acrylate is 2-ethylhexyl acrylate, while particularly preferred vinylphosphonates are bis(beta-chloroethyl)vinylphosphonate and bis(2-ethylhexyl)vinylphosphonate.

The aforementioned internally plasticized copolymer can be formed by conventional bulk, emulsion, suspension, or solution polymerization procedures, although suspension polymerization is preferred.

Also useful in the present invention is the internally plasticized resin described in U.S. Pat. No. 4,210,739 to R. E. Gallagher et al. which comprises from about 45% to about 80%, by weight, vinyl chloride, from about 15% to about 54%, by weight, of a $C_2$–$C_{10}$ alkyl acrylate, and from about 10% to about 15%, by weight, of at least one $C_8$–$C_{22}$ dialkyl maleate or fumarate.

The use of the above-described type of internally plasticized resin allows for production of a film having the desired degree of flexibility without the use of any significant amount of external plasticizer such as employed in certain prior art films. Generally speaking, the amount of internally plasticized resin in the vinyl film can range from about 35% to about 75%, by weight of the film depending upon the type of film required.

The ethylene/carbon monoxide polymer which is responsible for the improved physical properties for films made from the blend of the present invention is a known material and has been suggested as an additive to conventional, non-internally plasticized polyvinyl chloride resins (see U.S. Pat. No. 3,780,140 to C. F. Hammer). It is a copolymer of: (a) from about 40% to about 80% ethylene; (b) about 3% to about 30% carbon monoxide; and (c) from about 5% to about 60%, by weight of one or more termonomers copolymerizable therewith. Examples of suitable termonomers include the $C_3-C_{20}$ unsaturated mono- and dicarboxylic acids and their esters; the $C_1-C_{18}$ vinyl esters of saturated carboxylic acids; the vinyl $C_1-C_{18}$ alkyl ethers, acrylonitrile; methacrylonitrile; the $C_3-C_{12}$ alpha olefins, and ring compounds such as norbornene and vinyl aromatic compounds. A preferred polymer comprises 40–80% ethylene, 3–30% carbon monoxide, and 10–50% vinyl acetate. Ethylene/carbon monoxide polymers of this type are commercially available under the trademark ELVALOY from E. I. DuPont deNemours and Company.

The weight amount of ethylene/carbon monoxide polymer which needs to be used in the blend is relatively small in order to be effective to give the intended improvement in the physical properties for the films formed therefrom. Generally, an amount of ethylene/carbon monoxide polymer ranging from about 5% to about 40%, by weight of the blend of internally plasticized resin and ethylene/carbon monoxide terpolymer will be sufficient. The use of harder internally plasticized resins (which contain a higher vinyl chloride content) will require use of higher amounts of the ethylene/carbon monoxide polymer. Generally, the amount of internally plasticized copolymer will range from about 35% to about 75%, by weight of the entire composition. The weight ratio of internally plasticized copolymer to ethylene/carbon monoxide polymer will generally be within the range of from about 4:1 to about 1.5:1 with a higher ratio of internally plasticized resin being required when its vinyl chloride content is lower.

A number of other additives are used in manufacturing the vinyl film component contained in the laminates of the present invention. Included as potential additives are the following:

(a) fillers and/or pigments. The amount of filler that is chosen can range from about 0% to about 20%, by weight. Fillers and pigments are used to provide desired color to the film, to provide opacity, and to aid in the calendering of the film forming composition. Representative pigments or fillers include such inorganic materials as titanium dioxide, calcium carbonate, zinc oxide, white lead, gypsum, precipitated silica, carbon black, red iron oxide. Others are well known by the person of ordinary skill in the art.

(b) monomeric and polymeric process aids. These additives serve to aid in the processing of the calenderable film forming compositions as well as giving the film favorable visual appearance. Included are such polymeric additives as PVC/acrylate resin, arcylate processing aids, and chlorinated polyethylene, which produce a smooth surface on the calendered film, and alpha methyl styrene or acrylic polymers which also function as process aids. These additives may be used at from about 2% to about 15%, by weight of the film.

(c) lubricants. These may be present at from about 0.5% to about 3%, by weight of the film. Included as representative lubricants are stearic acid, stearamide, the polyethylene waxes, hydrocarbon oils, and the like.

(d) stabilizers and antioxidants. These may be present at from about 3% to about 10%, by weight of the film. Included are the stearate salts, the epoxidized vegetable oils, dibasic lead phosphite and dibutyl tin dilaurate, dimaleate or mercaptide. Others that may be selected are well known to persons of ordinary skill in the art.

Other functional additives that can be present in relatively minor amount (under 2%, by weight, of the film) include ultraviolet light stabilizers, drying agents, and the like.

The first step in forming the vinyl film laminate of the present invention is the formation of a film forming composition which can be calendered and which has good chemical resistance and outdoor durability. The aforementioned internally plasticized resin, ethylene/carbon monoxide polymer, filler and/or pigment, monomeric and polymeric process aid, lubricant, or stabilizers and antioxidant components can be selected in the aforementioned amounts, if desired. These selected ingredients are mixed until they are in the form of a homogeneous powdery composition. They can be then fluxed under sufficient heat and pressure to yield a composition of a dough-like consistency. After passing through a strainer apparatus they are ready for calendering.

This film formulation is then calendered at a temperature and pressure which allows formation of a film having a thickness of aboug 125 to 375 microns. A calendering temperature of from about 130° to about 180° C. is recommended.

The film can be used to form laminate products which are useful in upholstery applications. These laminates contain a suitable fabric substrate (e.g., woven, non-woven, blends of woven or non-woven, and so forth) attached to the vinyl film (for example, by means of a plastisol adhesive). The laminates can be formed by any means used to form conventional externally plasticized vinyl film/fabric substrate laminates. Some examples of such procedures include: transfer coating, direct calender lamination, and post-lamination.

The present invention is further illustrated by the Examples which follow.

EXAMPLE 1

This Example illustrates the formation of a film and laminated product in accordance with the present invention.

The ingredients listed below were milled together on a two-roll mill at a temperature of about 160° to 165° C. for about 20 minutes to form a film:

| Ingredient | Amount (Parts by Weight) |
| --- | --- |
| Internally plasticized resin* | 45.7 |
| Ethylene/vinyl acetate/carbon monoxide polymer (ELVALOY 741P brand) | 23.2 |
| Antimony oxide (CHEMTRON L brand) | 2.5 |
| Anhydrous aluminum silicate filler (BURGESS KE brand) | 7.0 |
| Bis-stearamide lubricant (ADVAWAX | 0.5 |

| Ingredient | Amount (Parts by Weight) |
| --- | --- |
| 240) | |
| Dioctyl azelate plasticizer | 4.0 |
| Partially oxidized polyethylene lubricant | 1.2 |
| Zinc heat stabilizer (SYNPRON 1402 brand) | 3.0 |
| Barium/cadmium heat stabilizer (SYNPRON 1517 brand) | 1.0 |
| Titanium dioxide pigment (R-900 brand) | 5.7 |
| Epoxidized soya oil heat and light stabilizer (G-62 brand) | 3.5 |
| Stearic acid | 0.7 |
| Silica (FK-310 brand) | 1.0 |
| Phenolic antioxidant (CYANAMID 2246 brand) | 0.5 |
| Calcium stearate lubricant | 0.5 |

*a terpolymer which comprises about 75%, by weight, vinyl chloride, about 18%, by weight, 2-ethylhexyl acrylate, and about 7%, by weight, bis(beta)chloroethyl)-vinylphosphonate.

vinyl chloride, about 18%, by weight, 2-ethylhexyl arcylate, and about 7%, by weight, bis(beta)chloroethyl)vinylphosphonate.

The film which was formed, as described above, had the following properties:

| Test | Value |
| --- | --- |
| Graves Tear Strength (ASTM D 1004-66) | 29.8/39.5 kg./cm. (mach. dir./cross dir.) |
| Film Color (after 400 hrs. in ATLAS FADE-O-METER apparatus) (ASTM G25-70) | No change |
| Film Color (after 400 hrs. in WEATHER-O-METER apparatus) (ASTM D 2565-27) | No change |

Laminated products were made from the film by laminating the film to a non-woven polyester-polyurethane substrate having a thickness of about 889–1016 microns (CAFJ-140 brand from Foss Manufacturing) at a temperature of about 150° C. using a plastisol adhesive at about 33.9 gm./m² in a laminating/embossing apparatus. The laminates were then topcoated with a blend of PVC and polymethylmethacrylate in a ratio of 3:2. The topcoated film/fabric laminate was then tested for its cold crack properties at −28.9° C. with and without a heat ageing procedure (93.3° C. for 6 days):

| Laminated Product | Result |
| --- | --- |
| Non-heat aged | Pass |
| Heat aged | Fail |

"Pass" indicates no cracking when a 1.81 kg. weight falling through 20.3 cm. strikes the sample mounted on a 5.1 cm. thick foam mounted on wood. "Fail" indicates cracking of the sample.

EXAMPLE 2

This Example illustrates another embodiment of the present invention which is particularly preferred.

A film forming composition was prepared as described in Example 1 from the following ingredients:

| Ingredient | Amount (Parts by Weight) |
| --- | --- |
| Internally plasticized resin* | 45.7 |
| Ethylene/vinyl acetate/carbon monoxide polymer (ELVALOY 741P brand) | 25.2 |
| Antimony oxide flame retardant (CHEMTRON L brand) | 2.5 |
| Magnesium carbonate filler (MAGCARB L brand) | 5.0 |
| Octyl epoxy stearate heat and light stabilizer (DRAPEX 3.2 brand) | 3.5 |
| Bis-stearamide lubricant (ADVAWAX 240) | 0.5 |
| Dioctyl azelate plasticizer | 4.0 |
| Partially oxidized polyethylene lubricant | 1.2 |
| Zinc heat stabilizer (SYNPRON 1402 brand) | 3.0 |
| Barium/cadmium heat stabilizer (SYNPRON 1517 brand) | 1.0 |
| Titanium dioxide pigment (R-900 brand) | 5.7 |
| Stearic acid lubricant | 0.7 |
| Silica release agent (FK 310 brand) | 1.0 |
| Phenolic antioxidant (CYANAMID 2246 brand) | 0.5 |
| Calcium stearate lubricant | 0.5 |

*the terpolymer used in Example 1.

The formulation mentioned above was fluxed on a two-roll mill for about 20 minutes at a temperature of about 160°–165° C. to generate a film having a thickness of about 254–305 microns for determination of physical property characteristics. The following was noted:

| Test | Value |
| --- | --- |
| Graves Tear Strength (ASTM D 1004-66) | 26.4/35.2 kg./cm. (mach. dir./cross dir.) |

Laminated products were made from the film by laminating the film to a non-woven polyester-polyurethane substrate having a thickness of about 889–1016 microns at a temperature of about 150° C. in a laminating/embossing apparatus. The laminates were then topcoated with a blend of PVC and polymethyl methacrylate in a ratio of 3:2. The laminated film/fabric was then tested for its cold crack properties at −28.9° C. with and without a heat aging procedure (93.3° C. for 6 days) according to the test described in Example 1.

| Laminated Product | Result |
| --- | --- |
| Non-heat aged | Pass |
| Heat aged | Pass |

EXAMPLES 3–6

These Examples illustrate the formation of additional films and laminated products. The same procedure used in Examples 1 and 2 was employed except where noted. The following ingredients were used to form the film forming composition:

| Ingredient | Amount (Parts by Weight) | |
| --- | --- | --- |
| | 3 | 4 |
| Internally plasticized resin* | 42.3 | 42.3 |
| Ethylene/vinyl acetate/carbon monoxide polymer (ELVALOY | 20.2 | 20.2 |

-continued

| Ingredient | Amount (Parts by Weight) | |
| --- | --- | --- |
| 741P brand) | | |
| Chlorinated polyethylene (Dow CPE 4213 brand) | 8.4 | 8.4 |
| Antimony oxide flame retardant (CHEMTRON L brand) | 2.5 | 2.5 |
| Magnesium carbonate filler (MAGCARB L brand) | 5.5 | 5.5 |
| Epoxidized soyabean oil (G-62 brand) | 3.5 | — |
| Octyl epoxy stearate heat and light stabilizer (DRAPEX 3.2 brand) | — | 3.5 |
| Bis-stearamide lubricant (ADVAWAX 240) | 0.5 | 0.5 |
| Dioctyl azelate plasticizer | 4.0 | 4.0 |
| Partially oxidized polyethylene lubricant | 1.2 | 1.2 |
| Zinc heat stabilizer (SYNPRON 1402 brand) | 3.0 | 3.0 |
| Barium/cadmium heat stabilizer (SYNPRON 1517 brand) | 1.0 | 1.0 |
| Titanium dioxide pigment (R-900 brand) | 5.7 | 5.7 |
| Stearic acid lubricant | 0.7 | 0.7 |
| Silica release agent (FK-310 brand) | 1.0 | 1.0 |
| Calcium stearate lubricant | 0.5 | 0.5 |
| | 5 | 6 |
| Internally plasticized resin* | 45.7 | 45.7 |
| Ethylene/vinyl/acetate carbon monoxide polymer (ELVALOY 741P brand) | 25.2 | 25.2 |
| Chlorinated polyethylene (Dow CPE 4213 brand) | — | — |
| Antimony oxide flame retardant (CHEMTRON L brand) | 2.5 | 2.5 |
| Magnesium carbonate filler (MAGCARB L brand) | 5.0 | 5.0 |
| Epoxidized soyabean oil (G-62 brand) | 3.5 | — |
| Octyl epoxy stearate heat and light stabilizer (DRAPEX 3.2 brand) | — | 3.5 |
| Bis-stearamide lubricant | 0.5 | 0.5 |
| Dioctyl azelate plasticizer | 4.0 | 4.0 |
| Partially oxidized polyethylene lubricant | 1.2 | 1.2 |
| Zinc heat stabilizer (SYNPRON 1402 brand) | 3.0 | 3.0 |
| Barium/cadmium heat stabilizer (SYNPRON 1517 brand) | 1.0 | 1.0 |
| Titanium dioxide pigment (R-900 brand) | 5.7 | 5.7 |
| Stearic acid lubricant | 0.7 | 0.7 |
| Silica release agent (FK-310 brand) | 1.0 | 1.0 |
| Calcium stearate lubricant | 0.5 | 0.5 |
| Phenolic antioxidant (AMERICAN CYANAMID 2246) | 0.5 | 0.5 |

*the terpolymer used in Example 1.

The laminates from Examples 3–6 were subjected to various physical property tests with the following significant results being noted:

| | Laminate Example No. | | | |
| --- | --- | --- | --- | --- |
| | 3 | 4 | 5 | 6 |
| Weight (gm./m²) | 467.8 | 498.3 | 518.7 | 508.5 |
| Adhesion (MD)[1] | CNS | 1786 | CNS | CNS |
| Pliability (mm.)[2] | 18.03 | 20.12 | 9.98 | 20.42 |
| Stretch (MD, %)[3] | 32.3 | 34.3 | 27.6 | 41.3 |
| Set (MD, %)[4] | 8.0 | 8.0 | 9.3 | 8.0 |
| Tensile Grab (MD)[5] | 477/545 (MD/CD) | 405 | 365 | 360 |
| Tongue Tear (MD)[6] | — | 95 | 95 | 90 |
| MVSS 302[7] | SE | SE | SE | SE |
| Abrasion, Wyzenbeek[8] | OK | OK | OK | OK |

[1]Adhesion of the film to the fabric was tested in accordance with ASTM D 751-68. The abbreviation CNS indicates that the film and fabric could not be separated. The rate of travel of the lower jaw of the tensile tester was 5.08 cm. per minute. The abbreviations MD and CD stand for machine direction and cross-direction, respectively, and indicate the direction in which the force was applied. The laminate from Example No. 4 separated at 1786 gm./cm. when tested in the machine direction.
[2]run at 21.1° C., 50% relative humidity. This test determines the deflection imparted to a weighted (30 gm.) thickness gauge mounted on top of a loop of the sample when the sample is raised by one inch. The sample is 2.54 cm. × 7.62 cm. with the long dimension being the machine direction and the coating is on the outside. The higher the gauge deflection, the stiffer the material. A completely rigid sample would give a value of 25.4 mm. For comparison, typical values for conventional automobile upholstery will be higher than 19.05 mm. with a 50 gm. weight; much higher for a 30 gm. wt.
[3]run in accordance with Chemical Fabrics and Film Assn. (CFFA)-19 test procedure.
[4]The percentage for stretch figure represents the percentage increase in length after 10 minutes while under a load of 12.25 kg. The percentage for set indicates the increase in length after the load is removed and the samples are allowed to relax for 10 minutes.
[5]the values are given in Newtons when tested in accordance with ASTM 751-68. It represents the tensile or breaking strength of the samples.
[6]the values are given in Newtons when tested in accordance with Federal Standard 191, Method 5134. It represents the tearing strength of the samples.
[7]MVSS 302 (Motor Vehicle Safety Standard 302) tests the flammability of the samples with "SE" denoting "self-extinguishing".
[8]the Wyzenbeek method (Federal Standard No. 191, Method 5304) measures the abrasion resistance of coated fabrics using the Wyzenbeek and Staff abrasion wear tester. The results were determined under standard test conditions after 25,000 double rubs. "OK" indicates no visible abrasion was noted.

The laminate from Example 3 was also tested for its fogging characteristics. The sample was placed in a cylindrical holder about 15.24 cm. in diameter and heated to 71.1° C. One end of the cylinder was closed, and the other sealed by a glass cap maintained at 37.8° C. Volatile material was collected on the glass cap reducing the light transmission to about 80% after 72 hours. For comparison, standard externally plasticized automobile upholstery have a value of about 40% original light transmission after about 72 hours.

EXAMPLE 7

The laminates from Examples 5 and 6 were also tested for cold crack properties after being coated with two differing topcoats. Both topcoats were applied by 33.5 line per cm. pad rolls at room temperature followed by air drying.

Topcoat A was a vinyl/acrylic topcoat with a vinyl/acrylate ratio of 3/2.

Topcoat B was a urethane topcoat sold under the tradmark PERMUTHANE U-10-046 by Beatrice Chemical Co.

A series of laminates were tested for its cold crack properties at −28.9° C. with and without heat aging at 93.3° C. for 6 days.

| | Unheat Aged | | Heat Aged | |
| --- | --- | --- | --- | --- |
| Laminate from Example | Topcoat A | Topcoat B | Topcoat A | Topcoat B |
| 5 | 3 of 4 passed | 2 of 2 passed | 1 of 4 passed | 2 of 2 passed |
| 6 | 4 of 4 passed | 2 of 2 passed | 4 of 4 passed | 2 of 2 passed |

EXAMPLE 8

This Example illustrates three additional films formed in accordance with the present invention using the process of Example 1:

| Ingredient | Amount (Parts by Weight) | | |
|---|---|---|---|
| | A | B | C |
| Internally plasticized resin* | 42.5 | 42.5 | 42.5 |
| Ethylene/vinyl acetate/ carbon monoxide polymer (ELVALOY 741 P brand) | 20.2 | 20.2 | 20.2 |
| Silica (CAB-O-SIL, M-5 brand) | 0.6 | 0.6 | 0.6 |
| Calcium Carbonate (ATOMITE brand) | 7.8 | — | — |
| Chlorinated polyethylene (CPE-4213 brand) | — | 7.8 | 7.8 |
| Magnesium Carbonate (MAGCARB L brand) | 7.1 | 7.1 | 7.1 |
| Antimony oxide (CHEMTRON L brand) | 2.5 | 2.5 | 2.5 |
| Bis-stearamide lubricant (ADVAWAX 240 brand) | 0.6 | 0.6 | 0.6 |
| Partially oxidized polyethylene lubricant | 2.0 | 2.0 | 2.0 |
| Dioctyl azelate plasticizer | 3.5 | 3.5 | 3.5 |
| Zinc heat stabilizer (SYNPRON 1402 brand) | 3.0 | 3.0 | 3.0 |
| Barium/cadmium heat stabilizer (SYNPRON J-86 brand) | 1.0 | 1.0 | 1.0 |
| Titanium dioxide pigment (R-900 brand) | 5.7 | 5.7 | 5.7 |
| Polyvinyl chloride suspension resin (SCC-20 brand) | 0.3 | 0.3 | — |
| Epoxidized soya oil heat and light stabilizer G-62 brand) | 3.2 | 3.2 | 3.5 |

*the terpolymer used in Example 1.

The Shore "A" hardness (10 sec.) of each of the films made from the above formulations were as follows:

| | A | B | C |
|---|---|---|---|
| Shore "A" Hardness | 68 | 66 | 62 |

EXAMPLE 9

This Example gives a particularly preferred embodiment of the present invention. The following formulation was calendered into films having thicknesses of 203.2 and 254 microns, respectively.

| Ingredient | Amount by Weight |
|---|---|
| Internally plasticized resin* | 45.0 |
| Ethylene/vinyl acetate/carbon monoxide polymer (ELVALOY 741 P brand) | 25.4 |
| Dilauryl thiodipropionate (DLTD) | 0.5 |
| Octyl epoxy tallate stabilizer (DRAPEX 44 brand) | 3.5 |
| Bis-stearamide lubricant (ADVAWAX 240 brand) | 0.7 |
| Stearic acid lubricant | 0.5 |
| Dioctyl azelate plasticizer | 3.65 |
| Barium/cadmium stabilizer (SYNPRON 1517 brand) | 5.0 |
| Liquid phosphite heat stabilizer (SYNPRON 1535 brand) | 1.0 |
| Magnesium oxide stabilizer (MAGLITE D) | 0.5 |
| Magnesium carbonate (MAGCARB L brand) | 4.25 |
| Antimony oxide fire retardant | 2.00 |
| (CHEMTRON L brand) | |
| Silica (CAB-O-SIL, EH-5 brand) | 0.50 |
| Acrylic/PVC Process Aid (SCC-7149 brand) | 3.00 |
| Polyethylene lubricant (PE-190 brand) | 1.00 |
| Ultraviolet absorber (CYASORB 531 brand) | 0.50 |
| Pigment paste** | 3.00 |

*the terpolymer used in Example 1.
**45.2 wt. % pigment dispersed in 54.8 wt. % dioctyl azelate.

All of the ingredients except the ethylene/carbon monoxide polymer were added to a cooled ribbon blender and were mixed for 30 minutes. The ethylene/carbon monoxide polymer was then added, and mixing was continued for an additional 30 minutes. The resulting powdery mixture was charged to an INTERMIX brand mixer where it was subjected to a temperature of approximately 148.9° C. for about five minutes. The resulting dough-like composition was extruded into a ribbon and fed to a 4-roll inverted L calender. The calendering temperatures were 148.9°–176.7° C. resulting in a 76.2 micron thick film.

This film was printed on laboratory equipment with a vinyl resin based ink, topcoated with a PVC/acrylic resin and laminated to a non-woven fabric using pressure and a temperature of about 135.1° C. Physical properties of the laminate so produced, in comparison to a conventional automotive upholstery product are given below:

| | Example 9 | Conventional |
|---|---|---|
| Weight (gm./m²) | 491.6 | 847.5 |
| Pliability* | 170 | 650 |
| Cold Crack (−28.9° C.) Initial | Pass | Pass |
| (After 6 days at 93.3° C.) | Pass | Pass |

*Gurley Pliability as determined on a No. 4171 apparatus manufactured by Testing Machines, Inc. of Amityville, N.Y. The procedure is PSSMA of TAPPI (Tech. Assoc. of the Pulp and Paper Institute. Lower numbers indicate a more pliable sample. The values express mg. of stiffness.

The foregoing Examples illustrate certain preferred embodiments of the present invention and should not be construed in a limiting sense. The scope of protection which is sought is set forth in the claims which follow.

What is claimed:

1. A film-forming blend containing an internally plasticized vinyl chloride copolymer which comprises from about 50% to about 85%, by weight, vinyl chloride, from about 3% to about 47%, by weight, of a $C_6$–$C_{10}$ alkyl acrylate, and from about 47% to about 3%, by weight, of a bis(hydrocarbyl)vinylphosphonate with an effective amount of an ethylene/carbon monoxide terpolymer to improve the physical properties of a film formed therefrom.

2. A blend as claimed in claim 1 wherein the weight ratio of internally plasticized copolymer to ethylene/carbon monoxide terpolymer ranges from about 4:1 to about 1.5:1 and wherein the internally plasticized copolymer comprises from about 40% to about 60%, by weight of the blend.

3. A film formed from the blend of either claims 1 or 2.

* * * * *